US011328511B2

(12) United States Patent
Muthiah et al.

(10) Patent No.: US 11,328,511 B2
(45) Date of Patent: May 10, 2022

(54) STORAGE SYSTEM AND METHOD FOR IMPROVED PLAYBACK ANALYSIS

(71) Applicant: Western Digital Technologies, Inc., San Jose, CA (US)

(72) Inventors: Ramanathan Muthiah, Bangalore (IN); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 91 days.

(21) Appl. No.: 16/818,452

(22) Filed: Mar. 13, 2020

(65) Prior Publication Data
US 2021/0287008 A1    Sep. 16, 2021

(51) Int. Cl.
*G06K 9/00*  (2022.01)
*G06V 20/40*  (2022.01)

(52) U.S. Cl.
CPC .............. *G06V 20/46* (2022.01); *G06V 20/41* (2022.01)

(58) Field of Classification Search
None
See application file for complete search history.

(56) References Cited

U.S. PATENT DOCUMENTS

| | | |
|---|---|---|
| 5,099,150 A | 3/1992 | Steele |
| 6,002,802 A | 12/1999 | Chujoh |
| 6,542,075 B2 | 4/2003 | Barker et al. |
| 6,768,661 B2 | 7/2004 | Vyvoda et al. |
| 7,631,327 B2 | 12/2009 | Dempski et al. |
| 7,760,230 B2 | 7/2010 | Russell et al. |
| 7,847,820 B2 | 12/2010 | Vallone et al. |
| 8,412,783 B2 | 4/2013 | Boston et al. |
| 8,516,019 B2 | 8/2013 | Hunt et al. |
| 8,676,027 B2 | 3/2014 | Hugosson |
| 8,725,940 B2 | 5/2014 | Grube et al. |
| 8,825,721 B2 | 9/2014 | Hunt et al. |
| 9,037,921 B1 | 5/2015 | Brooker et al. |
| 9,215,423 B2 | 12/2015 | Kimble et al. |
| 9,414,109 B2 | 8/2016 | Cheng et al. |
| 9,489,580 B2 | 11/2016 | Laska et al. |
| 9,781,479 B2 | 10/2017 | Klappert et al. |
| 9,836,248 B2 | 12/2017 | Zhang et al. |

(Continued)

FOREIGN PATENT DOCUMENTS

| | | |
|---|---|---|
| EP | 1173020 A2 | 1/2002 |
| EP | 1173020 A3 | 7/2002 |

(Continued)

OTHER PUBLICATIONS

International Search Report dated Aug. 5, 2020 for International Application No. PCT/US2020/037897.

(Continued)

*Primary Examiner* — Santiago Garcia
(74) *Attorney, Agent, or Firm* — Crowell & Moring LLP (57) ABSTRACT

A storage system and method for improved playback analysis are provided. In one embodiment, a storage system is provided comprising a memory and a controller. The controller is configured to identify a plurality of frames in video data stored in the memory that differ from surrounding frames by more than a threshold amount; receive a request from a host for quick playback of the video data; and send the plurality of frames to the host. Other embodiments are provided.

20 Claims, 8 Drawing Sheets

(56) References Cited

U.S. PATENT DOCUMENTS

| | | | |
|---|---|---|---|
| 10,007,442 | B2 | 6/2018 | Hahn et al. |
| 10,095,445 | B2 | 10/2018 | De et al. |
| 10,228,854 | B2 | 3/2019 | Romanovsky et al. |
| 2001/0044856 | A1 | 11/2001 | Agesen et al. |
| 2003/0093801 | A1 | 5/2003 | Lin |
| 2003/0225746 | A1 | 12/2003 | Braun |
| 2006/0190419 | A1 | 8/2006 | Bunn et al. |
| 2008/0310736 | A1* | 12/2008 | Chattopadhyay ... G06F 11/3692 382/218 |
| 2009/0319255 | A1 | 12/2009 | Vengerov |
| 2010/0272411 | A1* | 10/2010 | Shiitani .................. G11B 27/28 386/343 |
| 2010/0284612 | A1* | 11/2010 | Peters ...................... G06T 7/90 382/165 |
| 2011/0258375 | A1 | 10/2011 | Khosrowpour |
| 2012/0102297 | A1 | 4/2012 | Haines |
| 2013/0254611 | A1 | 9/2013 | Amerga et al. |
| 2014/0075096 | A1 | 3/2014 | Tanaka |
| 2015/0012671 | A1 | 1/2015 | Park et al. |
| 2015/0237351 | A1 | 8/2015 | Lee et al. |
| 2015/0261452 | A1 | 9/2015 | Moon |
| 2016/0211003 | A1 | 7/2016 | Chen et al. |
| 2016/0345009 | A1 | 11/2016 | Zhong et al. |
| 2017/0285949 | A1 | 10/2017 | Trika et al. |
| 2017/0285968 | A1 | 10/2017 | Jung et al. |
| 2018/0068540 | A1 | 3/2018 | Romanenko |
| 2018/0189635 | A1 | 7/2018 | Olarig et al. |
| 2018/0270499 | A1* | 9/2018 | Symes .................. H04N 19/43 |
| 2018/0295367 | A1 | 10/2018 | Mohhamed et al. |
| 2018/0341410 | A1 | 11/2018 | Benisty |
| 2019/0043201 | A1 | 2/2019 | Strong |
| 2019/0079677 | A1 | 3/2019 | Malladi et al. |
| 2019/0104341 | A1 | 4/2019 | Catalano et al. |
| 2019/0163622 | A1 | 5/2019 | Wu et al. |
| 2019/0187936 | A1 | 6/2019 | Naing et al. |
| 2019/0243754 | A1 | 8/2019 | Yu et al. |
| 2019/0246130 | A1 | 8/2019 | Sheikh |
| 2019/0294730 | A1 | 9/2019 | Jenkins et al. |
| 2019/0379926 | A1* | 12/2019 | Vari ................. H04N 21/47205 |
| 2020/0145701 | A1* | 5/2020 | Liu ...................... H04N 9/8205 |
| 2021/0090610 | A1* | 3/2021 | Wang .................. G11B 27/031 |
| 2021/0326646 | A1* | 10/2021 | Gultekin ................. G06T 7/215 |
| 2021/0392263 | A1* | 12/2021 | O'Donnell ......... H04N 5/23225 |

FOREIGN PATENT DOCUMENTS

| | | |
|---|---|---|
| EP | 2141928 A1 | 1/2010 |
| JP | 2010-161740 A | 7/2010 |
| KR | 10-2018-0015101 A | 10/2018 |
| KR | 10-2018-0114972 A | 10/2018 |
| WO | WO2015/154549 A1 | 10/2015 |
| WO | WO2017/134110 A1 | 8/2017 |

OTHER PUBLICATIONS

Written Opinion dated Aug. 5, 2020 for International Application No. PCT/US2020/037897.

U.S. Appl. No. 16/708,091, filed Dec. 2019, Muthiah et al.
U.S. Appl. No. 16/781,717, filed Feb. 2020, Muthiah et al.
U.S. Appl. No. 15/929,090, filed Jan. 2019, Muthiah et al.
U.S. Appl. No. 16/670,112, filed Oct. 2019, Muthiah et al.
European Search Report in EP Application No. 19216071.1, dated Feb. 7, 2020, 8 pages.
"Data differencing"; Wikipedia entry; downloaded from the Internet at https://en.wikipedia.org/wiki/Data_differencing on Aug. 6, 2019; 3 pages.
"H.264/MPEG-4 AVC"; Wikipedia entry; downloaded from the Internet at https://en.wikipedia.org/wiki/H.264/MPEG-4_AVC on Aug. 6, 2019; 18 pages.
"Video compression picture types"; Wikipedia entry; downloaded from the Internet at https://en.wikipedia.org/wiki/Video_compression_picture_types on Aug. 6, 2019; 4 pages.
U.S. Appl. No. 15/929,090, filed Jan. 11, 2019.
U.S. Appl. No. 16/781,717, filed Feb. 4, 2020 entitled "Storage System and Method for Optimized Surveillance Search."
U.S. Appl. No. 16/781,688, filed Feb. 4, 2020 entitled "Storage System and Method for Automatic Data Phasing."
U.S. Appl. No. 16/708,091, filed Dec. 9, 2019 entitled "Storage System and Method for Video Frame Segregation to Optimize Storage."
Office Action in U.S. Appl. No. 15/929,090, dated Feb. 20, 2020, 17 pages.
Office Action in U.S. Appl. No. 15/929,090, dated Sep. 27, 2019, 16 pages.
International Search Report dated Aug. 26, 2020 for International Application No. PCT/US2020/024852.
Written Opinion dated Aug. 26, 2020 for International Application No. PCT/US2020/024852.
Final Office Action dated Jul. 13, 2021 for U.S. Appl. No. 16/899,262.
Non-final Office Action dated Jul. 15, 2021 for U.S. Appl. No. 16/781,688.
International Search Report dated Jul. 6, 2021 for International Application No. PCT/US2020/037903.
Written Opinion dated Jul. 6, 2021 for International Application No. PCT/US2020/037903.
Office Action in U.S. Appl. No. 16/781,688, dated Apr. 2, 2021, 26 pages.
XuanHua Shi et al., "Deca: A Garbage Collection Optimizer for In-Memory Data Processing", <https://di.acm.org/doi/full Html/10.1145/3310361>, ACM Trans. Comput. Syst., vol. 36, No. 1, Article 3, Publication date: Mar. 2019. DOI: https://doi.org/10.1145/3310361 (Year: 2019), 66 pages.
"Trick mode"; Wikipedia entry; downloaded from the Internet at https://en.wikipedia.org/wiki/Trick_mode on Jul. 22, 2019; 1 page.
"MPEG transport stream"; Wikipedia entry; downloaded from the Internet at https://en.wikipedia.org/wiki/MPEG_transport_stream on Jul. 22, 2019; 6 pages.
Singh, S et al.; "Real-Time Implementation of Change Detection for Automated Video Surveillance System"; Research article; ISRN Electronics, vol. 2013, Article ID 691930; 5 pages; Jun. 11, 2013.

\* cited by examiner

STORAGE SYSTEM AND METHOD FOR IMPROVED PLAYBACK ANALYSIS

BACKGROUND

A storage system can be used to store a data stream sent to it by a host. The data can be stored in memory in the Moving Picture Experts Group Transport Stream (MPEG-TS) format. Searching the stored video for video frames of interest is often a requirement of surveillance systems. Typically, the host retrieves the entire stored video from the storage system and performs its own search to find the video frames of interest.

DETAILED DESCRIPTION

Overview

By way of introduction, the below embodiments relate to a storage system and method for improved playback analysis, which find particular use in surveillance storage systems. In one embodiment, a storage system is provided comprising a memory and a controller. The controller is configured to identify a plurality of frames in video data stored in the memory that differ from surrounding frames by more than a threshold amount; receive a request from a host for quick playback of the video data; and send the plurality of frames to the host.

In some embodiments, the controller is further configured to identify the plurality of frames based on entropy changes in the video data.

In some embodiments, the controller is further configured to detect entropy changes by decoding only I frames in the video data.

In some embodiments, the controller is further configured to create an album of the plurality of frames and send the album to the host.

In some embodiments, the controller is further configured to send time tags of the plurality of frames to the host and send the plurality of frames to the host in response to a request from the host for the time tags.

In some embodiments, the controller is further configured to send logical block addresses of the plurality of frames to the host and send the plurality of frames to the host in response to a request from the host for the logical block addresses.

In some embodiments, the controller is further configured to create an album of the plurality of frames and store the album in a private area of the memory.

In some embodiments, the controller is further configured to send the plurality of frames to the host using a vendor-specific protocol.

In some embodiments, the controller is further configured to receive a request from the host for additional frames of the video data and send the additional frames to the host.

In some embodiments, the controller is further configured to identify the plurality of frames as the video data is received by the storage system.

In some embodiments, the memory comprises a three-dimensional memory.

In another embodiment, a method is provided that is performed in a storage system comprising a memory. The method comprises identifying a plurality of instances in video data stored in the memory based on an entropy analysis; creating an album based on the identified plurality of instances; receiving a request from a host for the album; and sending the album to the host.

In some embodiments, the plurality of instances are identified by decoding only I frames in the video data.

In some embodiments, the album comprises the plurality of instances.

In some embodiments, the album comprises time tags or logical block addresses of the plurality of instances.

In some embodiments, the method further comprises storing the album in a private area of the memory.

In another embodiment, a storage system is provided comprising a memory; means for creating an album of frames of interest in video data stored in the memory; and means for sending the album to a host in response to a request for fast playback of the video data.

In some embodiments, the storage system further comprises means for storing the album in a private area of the memory.

In some embodiments, the storage system further comprises means for identifying the frames of interest based on entropy changes in the video data.

In some embodiments, the means for identifying decodes only I frames in the video data.

Other embodiments are possible, and each of the embodiments can be used alone or together in combination. Accordingly, various embodiments will now be described with reference to the attached drawings.

Embodiments

Figures 1A, 1B:
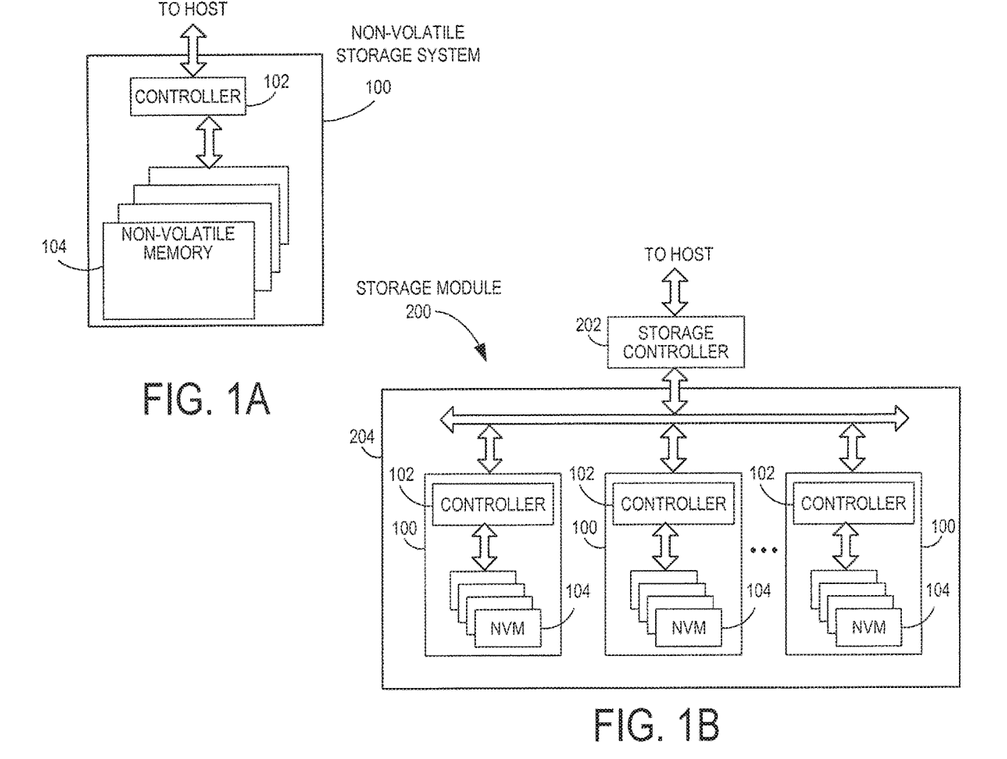
FIG. 1A is a block diagram of a non-volatile storage system of an embodiment.
FIG. 1B is a block diagram illustrating a storage module of an embodiment.
Figure 1C:
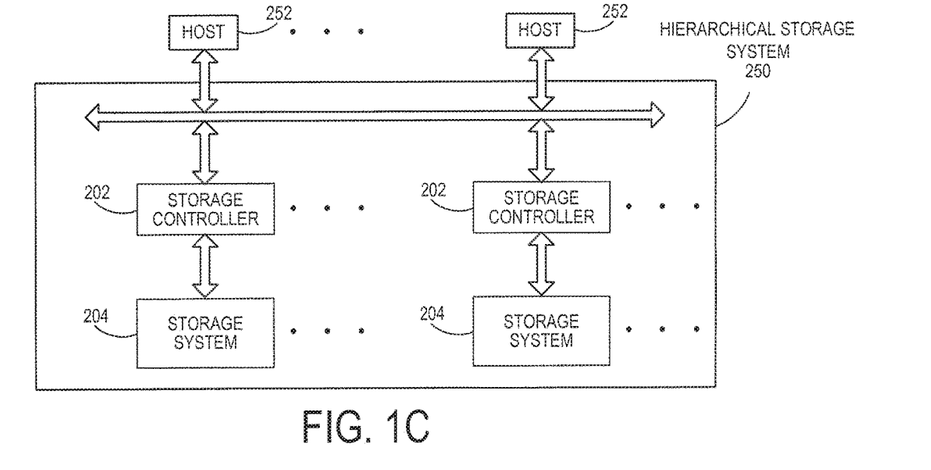
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
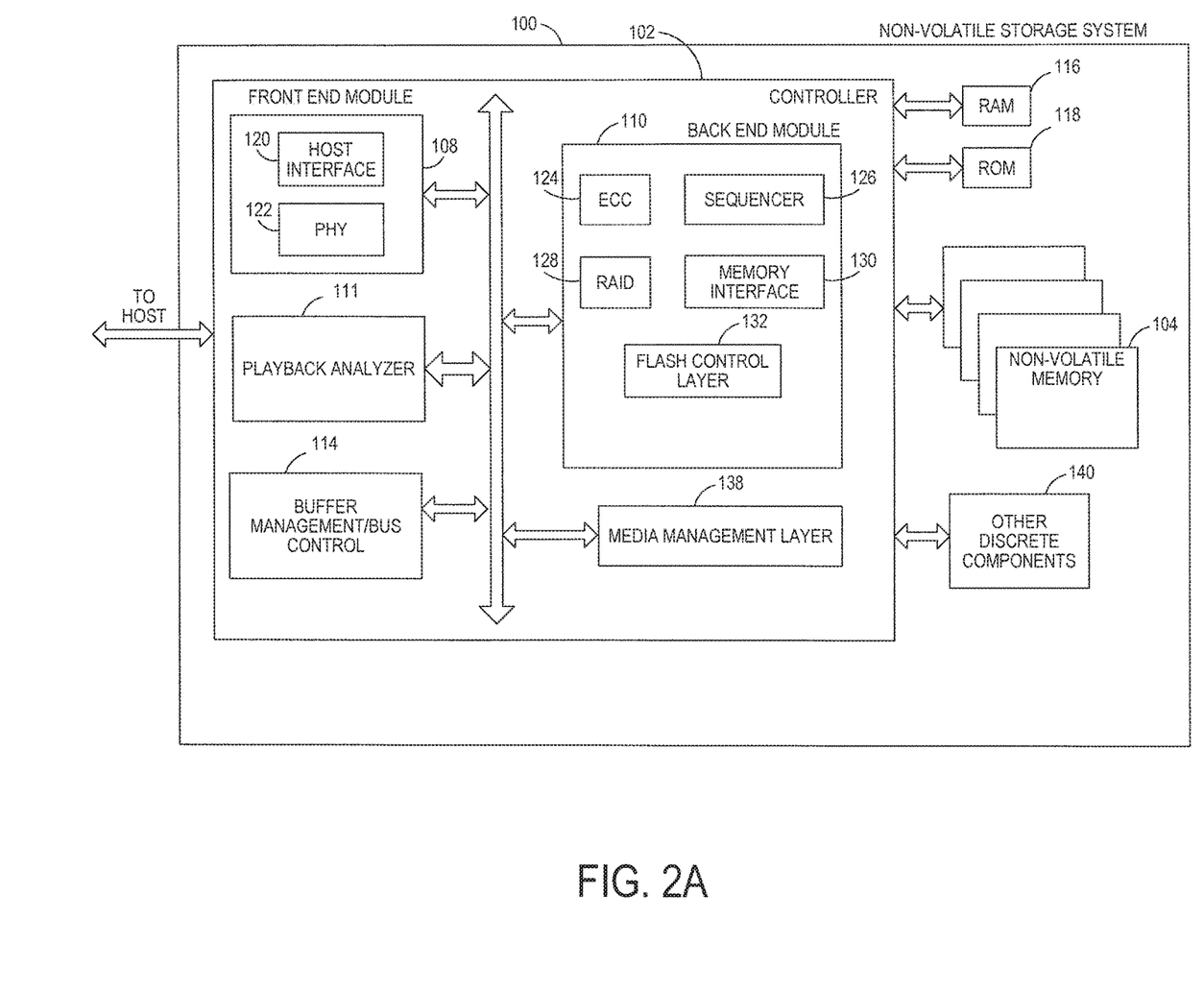
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a playback analyzer 111, which is discussed in more detail below, and can be implemented in hardware or software/firmware to extract various video frames from a video stream. The playback analyzer 11 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
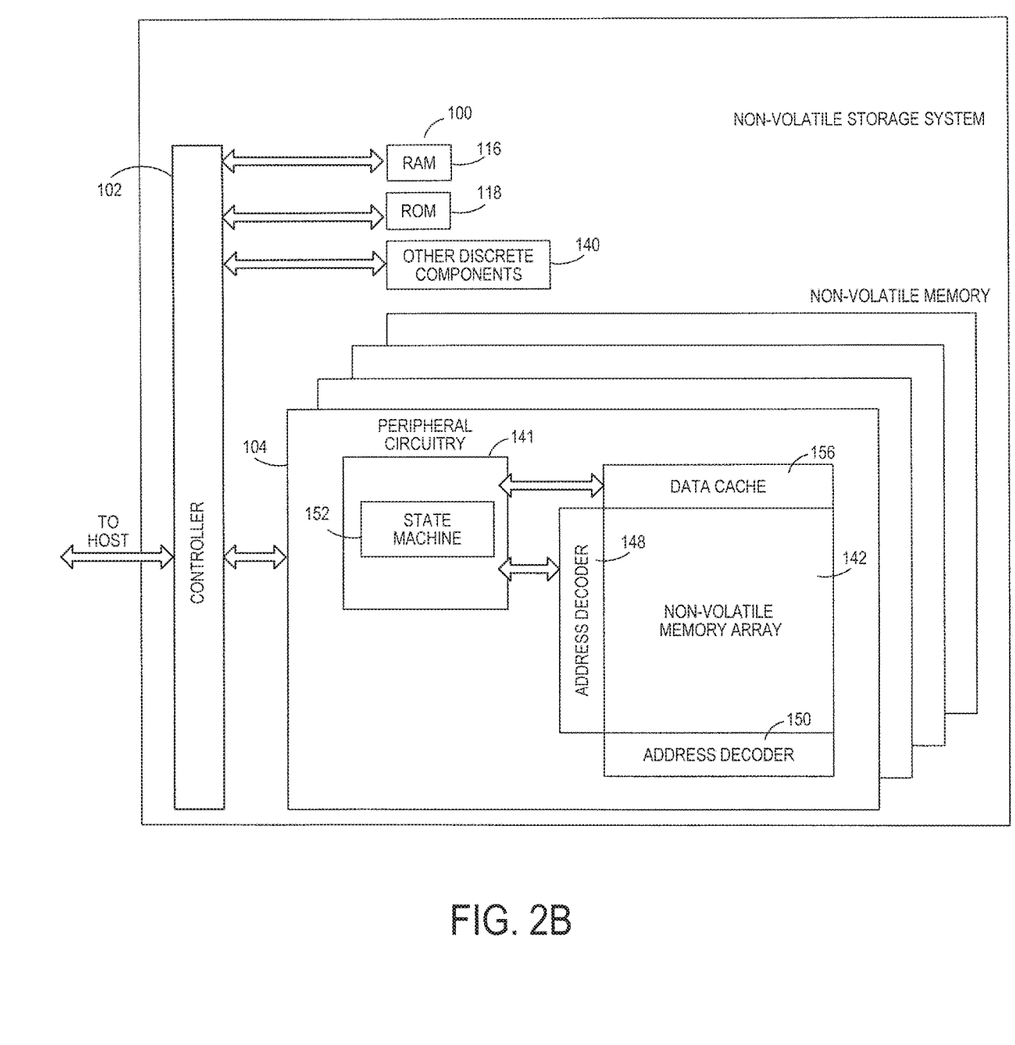
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

The storage system 100 can be used to store a data stream sent to it by a host. In one embodiment, the video data is stored in the memory 104 in the Moving Picture Experts Group Transport Stream (MPEG-TS) format, although other formats can be used. In general, with video compression, different video frames are compressed using different compression algorithms. Different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression.

Further, an Instantaneous Decoder Refresh (IDR) frame is a group of I-frame slices. With an IDR frame, all pictures in a reference buffer are marked as use for reference, and all subsequently-transmitted slices are decoded without reference to any frame decoded prior to the IDR frame. No frame after the IDR frame can reference any frame before it. IDR frames are used to avoid any distortions in the video when fast-forwarding. IDR frames are particularly useful for comparison to the reference image from the host because IDR frames are independently-decodable frames on par with an image.

As mentioned above, a storage system can be used to store a data stream sent to it by a host. Searching the stored video for video frames of interest is a major requirement of surveillance systems. Typically, the host retrieves the entire stored video from the storage system and performs its own search to find the video frames of interest. This can be a substantial workload. For example, in a typical system, the whole video stream is played back and analyzed. Usually, important data (video frames) are present across the video stream in short bursts along with unimportant data. Presence of information in this fashion makes playback a hectic task especially if playback is analyzed manually.

Figure 3:
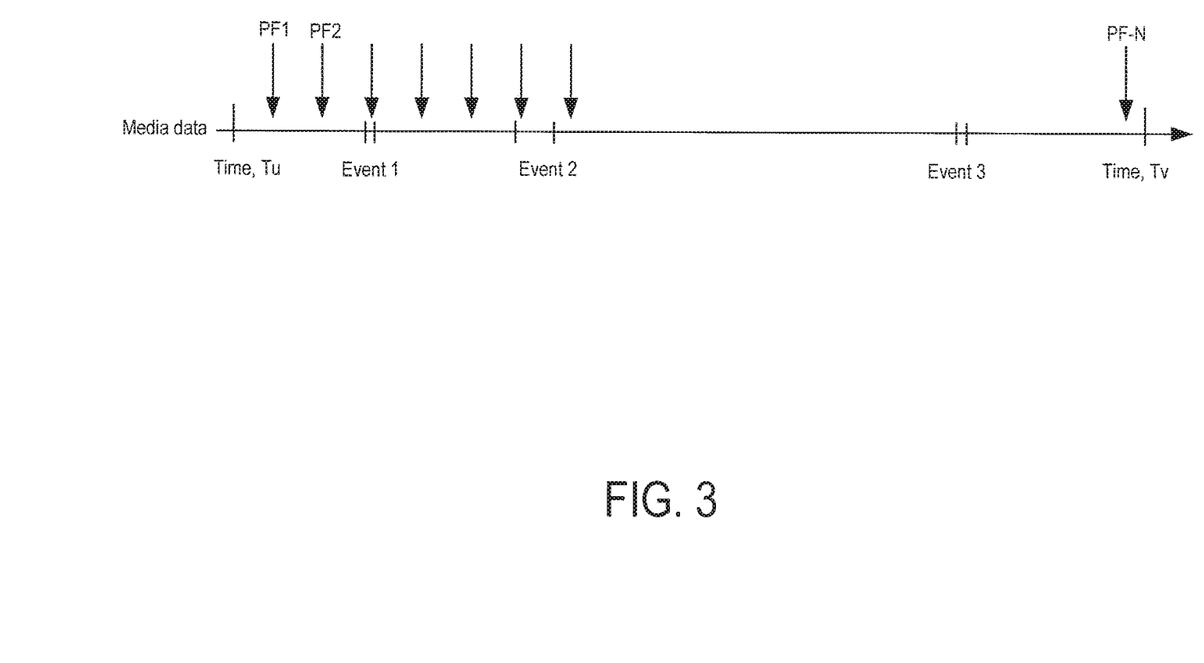
FIG. 3 is a diagram of a linear playback system of an embodiment.

The typical approach is for a user to do a plain fast-forward of the video stream by some factor during playback, which is a linear curve. FIG. 3 illustrates this type of linear playback system. As shown in FIG. 3, the host retrieves the entire video data file from the storage system and plays it back using a fast-forward function, which provides a series of playback frames (PF1 to PF-N) at fixed time internals to find desired events (Events 1, 2, and 3). While this approach may be sufficient for a DVR where a user is fast-forwarding through commercials, such a mechanism may not be optimum in surveillance applications, as this approach results in playing a lot of unnecessary media without substantial information in it.

The following embodiments can be used to improve playback analysis and find particular use in surveillance storage systems. In one embodiment, the controller 102 in the storage system 100 identifies a plurality of frames in the video data (sometimes referred to herein as "media data") stored in the memory 104 that differ from surrounding frames by more than a threshold amount. Such an identified frame is sometimes referred to herein as an "instance" or a "region of interest," and the plurality of frames is sometimes referred to herein as an "album."

When the storage system 100 receives a request from a host for quick playback of the video data, the storage system 100 can send the plurality of frames (the album) to the host instead of the entire video file stored in the memory 104, which minimizes data transfers between the storage system 100 and the host. The following paragraphs provide an example of one implementation of this embodiment. It should be understood that this is only an example and other implementations can be used.

In one embodiment, the controller 102 identifies a plurality of frames in the video data stored in the memory 104 that differ from surrounding frames by more than a threshold amount by defining "instances" based on entropy change in the video data. As used herein, an "instance" refers to a set of closely-bound video frames with a sufficient delta above a threshold, which can be defied by the host or by the storage system 100, for example. In one embodiment, the instances are identified based on an entropy change (e.g., a threshold delta change) in the video data over a time period. The entropy change defines the movement or specifically the delta difference or localized movement between closely-bound video frames in time. The entropy can be determined by the controller 102 through decoding. Since full-fledged decoding may be expensive, performing partial decoding (e.g., only of I frames) and determining the difference between two subsequent I frames alone may be sufficient to determine the real information in a time span. Such a partial decoding approach can save bandwidth and resources. Since the intention is only to determine the information density, partial decoding may suffice.

Figure 4:
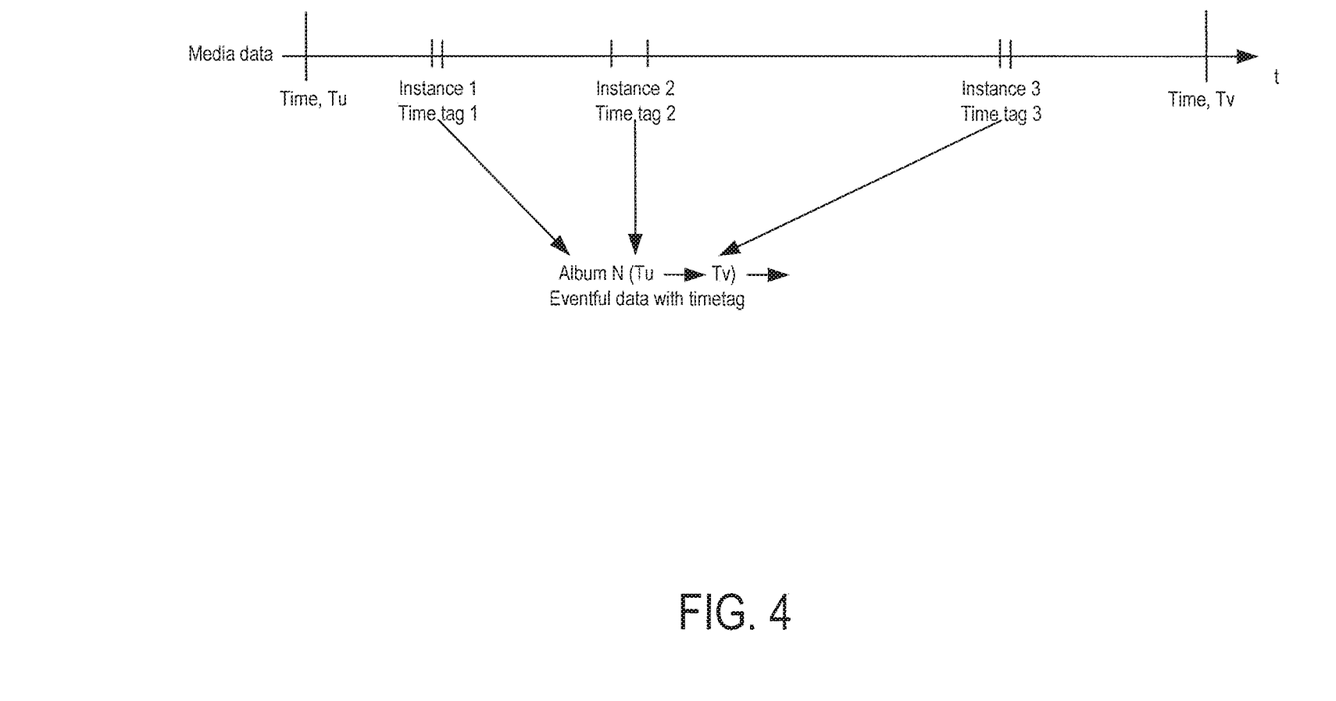
FIG. 4 is a diagram of a playback system of an embodiment based on information content.

The controller 102 can detect multiple instances over time, accumulate them, and tag them with the corresponding time in the video stream. Such a collection of instances is referred to herein as an album, which is a downsized and event-only version of the stored video data with time tags. As shown in FIG. 4, the album can be created from a series of time tags indicating where the eventful data occurs in the video stream.

The album can be stored in any suitable location in the storage system 100. For example, in one embodiment the album is stored as a video stream (containing only the frames of interest) in the same physical blocks in the memory 104 as the full stream (e.g., assuming frame alignment is addressed by dynamically modifying edge frames). However, in other embodiments, the album can be stored in a separate location in the memory for fast access, which can be managed as per agreement between the host and the storage system 100. For example, in one embodiment, the memory 104 comprises a second read-only logical unit number (LUN)/namespace under the control of the storage system 100 in which regions of interest are presented as files. The second LUN can appear after analysis is done and can remain read-only, which alleviates issues that can arise with a storage-system-modified file system.

In response to the host requesting the album, the storage system 100 provides the album to the host. For example, with reference to the block diagram in FIG. 5 and the flow chart 600 in FIG. 6, the host 50 initially stores the video data in the storage system 100 (act 510) (although the video data can come from another source) and when the host 50 requests playback/retrieval of the video data (act 610), the storage system 100 determines if the request is for quick playback or for typical playback (act 620). If the request is for typical playback, the storage system 100 sends the host 50 the entire video data file (act 630). However, if the request is for quick playback (520 in FIG. 5), the storage system 100 sends the host 50 the album (act 530, 640).

Figure 5:
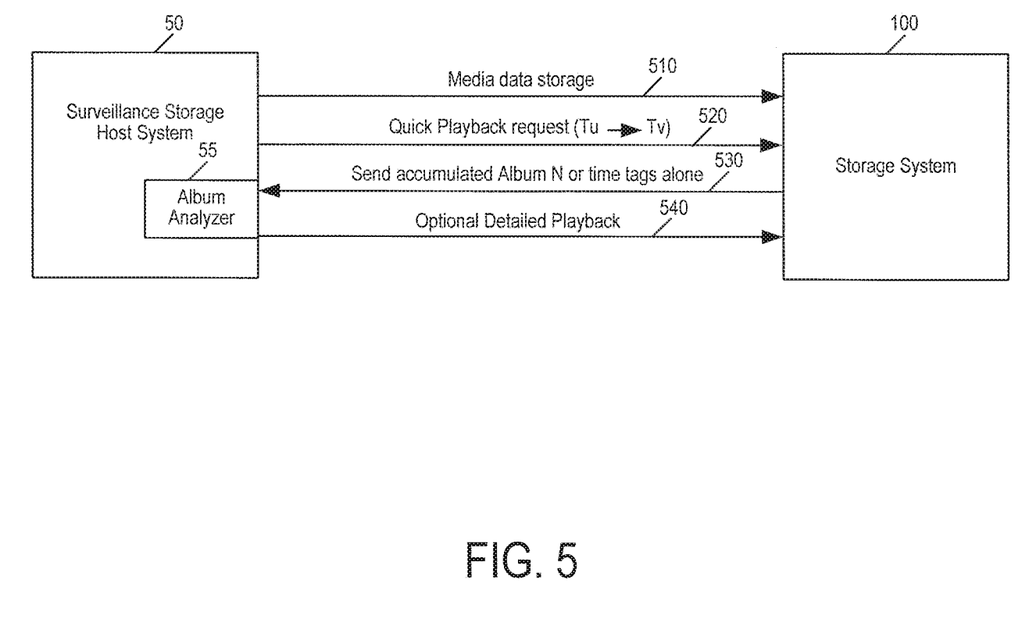
FIG. 5 is a block diagram of a host and storage system of an embodiment.
Figure 6:
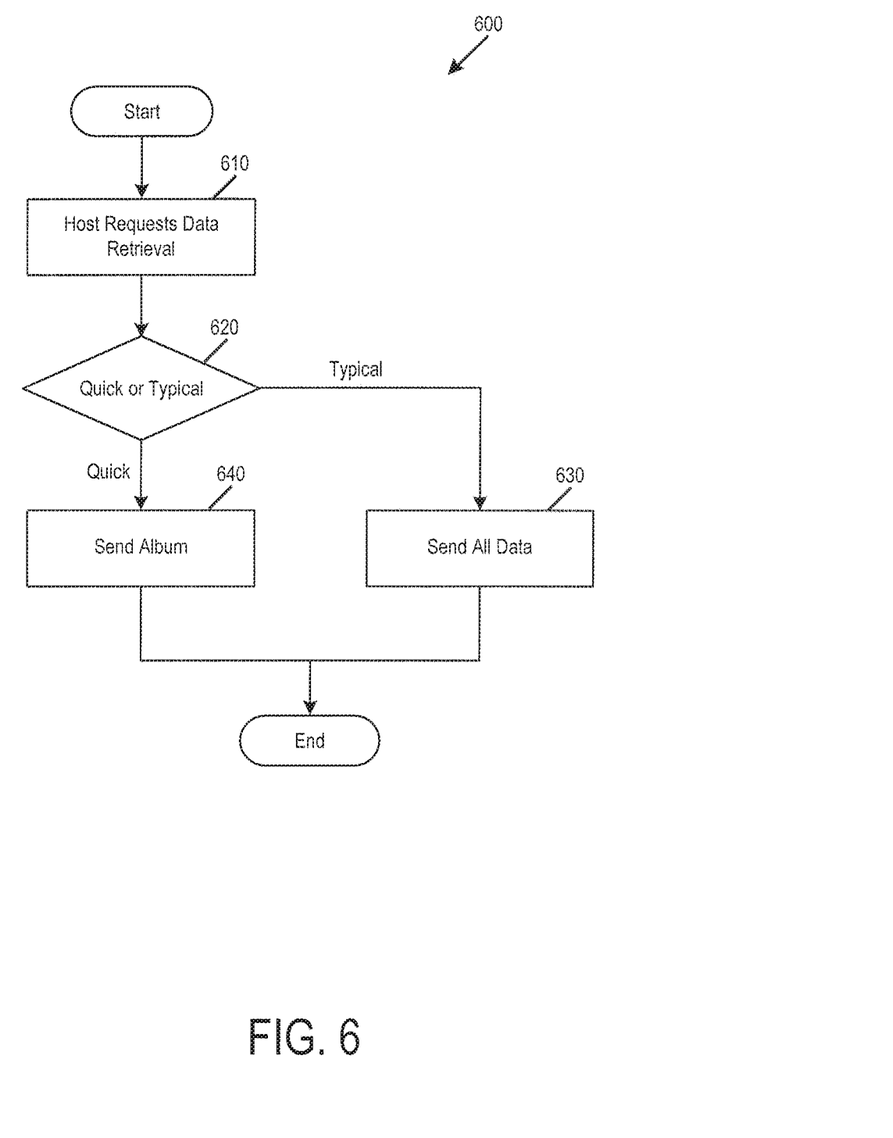
FIG. 6 is a flow chart of a read operation of an embodiment.

The album can be sent from the storage system 100 to the host 50 in any suitable way. For example, the storage system 100 can send the album to the host using a vendor-specific protocol. Also, the album can be sent to the host 50 as a video stream or as separate entities of different instances. Further, as indicated in FIG. 5, the storage system 100 can send the album itself to the host 50, or the storage system 100 can send the timestamp or logical block address (LBA) of each instance in the album. With this information, the host 50 can separately request the instances from the storage system 100.

When the host receives the album from the storage system 100, the host 50 can use its album analyzer 55 (e.g., hardware and/or computer-readable program code executed on a processor in the host 50) to analyze the received album and send a request (e.g., identifying the time tags) to the storage system 100 for retrieval/access to a portion of data around the instance of interest for detailed playback (act 540 in FIG. 5). The request for detailed playback can be on par with a typical flash read access request (also called trick mode in MPEG systems) based on a logical data representation but only for a portion of the stream. The time to identify the eventful logical data is shortened with this embodiment, and the described identification and segregation can lead to easier automation with playback.

In addition to using the retrieved album for optimizing playback, the host 50 can use the album for replication, archiving, or cloud storage, as per its requirements. For example, in some cases, the album can be uploaded by the host 50 to a separate storage system or to the cloud for better protection. The created album can further be classified by the host 50 as a prime snapshot or important data while handling logical data movement. This saves time and optimizes and assists automation of the data analysis in surveillance.

Figure 7:
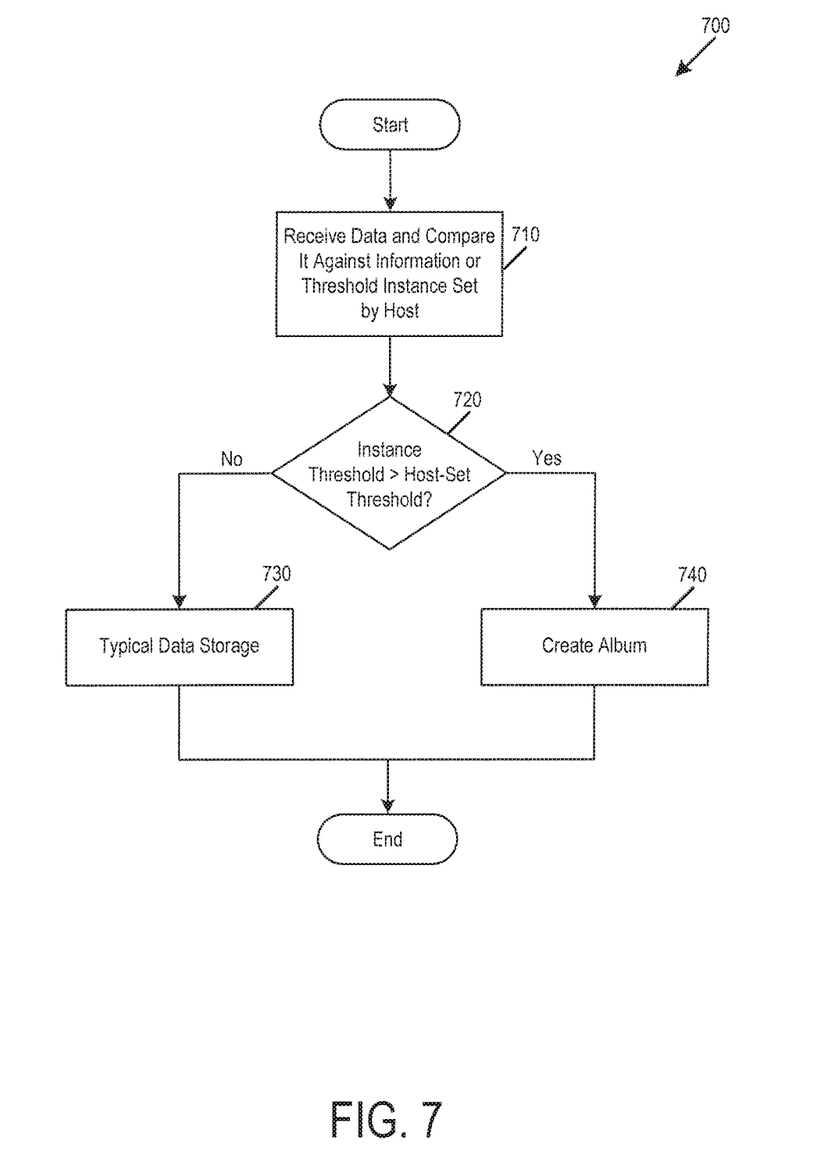
FIG. 7 is a flow chart of a write operation of an embodiment.

There are many alternatives that can be used with these embodiments. For example, as shown in the flow chart 700 in FIG. 7, instead of storing the entire video stream received from the host 50, the storage system 100 can just store the album. As shown in FIG. 7, when the host 50 sends video data to the storage system 100, the storage system 100 compares it against information or a threshold instance set by the host 50 (act 710). If the instance threshold is not greater than the host-set threshold, the storage system 100 performs typical data storage of the video stream (act 730). However, if the instance threshold is greater than the host-set threshold, the storage system 100 creates an album (act 740).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
identify a plurality of frames in video data stored in the memory that differ from surrounding frames by more than a threshold amount, wherein each frame in the video data is associated with a respective time tag;
receive, from a host, a request for quick playback of the video data;
in response to receiving the request from the host, send the plurality of frames instead of the video data to the host;
receive, from the host, an identification of time tags of frames not in the plurality of frames; and
send the frames corresponding to the time tags to the host.

2. The storage system of claim 1, wherein the controller is further configured to identify the plurality of frames based on entropy changes in the video data.

3. The storage system of claim 2, wherein the controller is further configured to detect entropy changes by decoding only intra-coded picture frames (I-frames in the video data.

4. The storage system of claim 1, wherein the controller is further configured to:
create an album of the plurality of frames; and
send the album to the host.

5. The storage system of claim 1, wherein the controller is further configured to send time tags of the plurality of frames to the host in response to a request from the host for the time tags of the plurality of frames.

6. The storage system of claim 1, wherein the controller is further configured to send logical block addresses of the plurality of frames to the host in response to a request from the host for the logical block addresses.

7. The storage system of claim 1, wherein the controller is further configured to:
create an album of the plurality of frames; and
store the album in a private area of the memory.

8. The storage system of claim 1, wherein the controller is further configured to send the plurality of frames to the host using a vendor-specific protocol.

9. The storage system of claim 1, wherein the controller is further configured to identify the plurality of frames as the video data is received by the storage system.

10. The storage system of claim 1, wherein the memory comprises a three-dimensional memory.

11. A method comprising:
performing the following in a storage system comprising a memory:
storing video data in a read-write logical unit number (LUN) of the memory;
identifying a plurality of instances in the video data based on an entropy analysis;
storing the identified plurality of instances as files in a read-only LUN, wherein the read-only LUN is under control of the storage system;
receiving, from a host, a request for quick playback of the video data;
sending, to the host, logical block addresses of each of the files stored in the read-only LUN;
receiving, from the host, a request to read the logical block addresses; and
sending the files to the host.

12. The method of claim 11, wherein the plurality of instances are identified by decoding only intra-coded picture frames (I-frames) the video data.

13. The method of claim 11, further comprising creating an album comprising the plurality of instances.

14. The method of claim 11, wherein the album comprises time tags of the plurality of instances.

15. A storage system comprising:
a memory;
means for identifying a plurality of frames in video data stored in the memory that differ from surrounding frames by more than a threshold amount, wherein each frame in the video data is associated with a respective time tag;
means for receiving, from a host, a request for quick playback of the video data;
means for sending the plurality of frames instead of the video data to the host n response to receiving the request from the host;
means for receiving, from the host, an identification of time tags of frames not n the plurality of frames; and
means for sending the frames corresponding to the time tags to the host.

16. The storage system of claim 1, wherein:
the video data is stored in a read-write logical unit number (LUN) of the memory; and
the controller is further configured to store the plurality of frames as files in a read-only LUN.

17. The method of claim 11, further comprising:
sending time tags of the plurality of instances to the host.

18. The method of claim 17, further comprising:
receiving, from the host, an identification of time tags of additional instances requested by the host.

19. The method of claim 11, wherein the files are sent to the host using a vendor-specific protocol.

20. The method of claim 13, wherein the album comprises logical block addresses of the plurality of instances.

* * * * *